(12) United States Patent
Cha (10) Patent No.: US 9,497,321 B2
(45) Date of Patent: *Nov. 15, 2016

(54) METHOD AND APPARATUS FOR SELECTIVE SILENCING OF TELEPHONE RINGING

(71) Applicant: Steve Cha, Franklin Lakes, NJ (US)

(72) Inventor: Steve Cha, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,488

(22) Filed: May 9, 2016

(65) Prior Publication Data

US 2016/0255193 A1   Sep. 1, 2016

Related U.S. Application Data (63) Continuation of application No. 14/843,242, filed on Sep. 2, 2015, now Pat. No. 9,338,292, which is a continuation of application No. 13/740,555, filed on Jan. 14, 2013, now Pat. No. 9,167,088, which is a continuation of application No. 13/299,811, filed on Nov. 18, 2011, now Pat. No. 8,369,494, which is a continuation of application No. 12/407,074, filed on Mar. 19, 2009, now Pat. No. 8,139,747.

(60) Provisional application No. 61/070,077, filed on Mar. 20, 2008.

(51) Int. Cl.
| | | |
|---|---|---|
| *H04M 3/42* | (2006.01) | |
| *H04M 3/436* | (2006.01) | |
| *H04M 3/537* | (2006.01) | |
| *H04M 1/663* | (2006.01) | |
| *H04M 3/02* | (2006.01) | |
| *H04M 1/247* | (2006.01) | |

(52) U.S. Cl.
CPC .............. *H04M 3/436* (2013.01); *H04M 1/247* (2013.01); *H04M 1/663* (2013.01); *H04M 3/02* (2013.01); *H04M 3/42059* (2013.01); *H04M 3/537* (2013.01)

(58) Field of Classification Search
CPC ................... H04M 3/53333; H04M 2203/253; H04M 3/537; H04M 2203/4536; H04M 3/436; H04M 1/72552
USPC .......... 379/201.01, 68, 88.12, 201.02, 88.22, 379/142.01, 142.04, 142.05, 142.09, 379/207.03, 207.15, 207.16, 210.02, 379/210.03, 211.01, 211.02, 373.01, 379/373.02, 51, 67.1, 88.13, 88.16, 88.23
See application file for complete search history.

(56) References Cited

U.S. PATENT DOCUMENTS

| | | |
|---|---|---|
| 5,351,289 A | 9/1994 | Logsdon et al. |
| 5,497,414 A | 3/1996 | Bartholomew |

(Continued)

*Primary Examiner* — Akelaw Teshale
(74) *Attorney, Agent, or Firm* — Cha & Reiter, LLC (57) ABSTRACT

A system and method for a selective ring silencer that prevents people from having to listen to the telephone ring on and on with nuisance calls. The ringer silencer can be: (1) discretely constructed from a telephone, (2) part of a telecommunication device, or (3) part of a central telephone network construction. A receiver demodulates an incoming call. Control logic reads at least a portion of the called identification (CID) data and determines an action based on the reading. A switch in communication with the control logic is actuated to a first state that allows the communication data to be output from the ring silencer, and a second state that blocks the communication data from being output from the ring silencer to a user's communication device. The control logic blocks toll-free area codes originated calls from ringing a user's telephone, optionally forwarding the call to a voice mail module.

20 Claims, 6 Drawing Sheets

(56) References Cited

U.S. PATENT DOCUMENTS

| | | |
|---|---|---|
| 5,537,467 A | 7/1996 | Cheng et al. |
| 6,005,870 A | 12/1999 | Leung et al. |
| 6,226,359 B1 | 5/2001 | Montgomery et al. |
| 6,587,683 B1 | 7/2003 | Chow et al. |
| 6,590,965 B1 | 7/2003 | Poole et al. |
| 6,701,160 B1 | 3/2004 | Pinder et al. |
| 7,231,029 B1 | 6/2007 | Kirkpatrick |
| 7,295,660 B1 | 11/2007 | Higginbotham et al. |
| 7,333,599 B2 | 2/2008 | Moss et al. |
| 7,492,888 B2 | 2/2009 | Power et al. |
| 7,738,636 B1 | 6/2010 | Wageman et al. |
| 7,940,917 B2 | 5/2011 | Lauridsen et al. |
| 2004/0096046 A1 | 5/2004 | Lection et al. |
| 2004/0131164 A1 | 7/2004 | Gould |
| 2004/0213396 A1 | 10/2004 | MacNamara et al. |
| 2004/0229600 A1 | 11/2004 | Saez et al. |
| 2004/0240650 A1 | 12/2004 | Bear et al. |
| 2004/0264666 A1 | 12/2004 | Guo et al. |
| 2005/0008135 A1* | 1/2005 | Bressler ............ H04M 1/57 379/211.01 |
| 2005/0117730 A1 | 6/2005 | Mullis et al. |
| 2005/0129206 A1* | 6/2005 | Martin ............ H04M 1/57 379/211.01 |
| 2005/0195954 A1 | 9/2005 | Klein et al. |
| 2005/0201362 A1 | 9/2005 | Klein et al. |
| 2005/0271196 A1 | 12/2005 | Florkey et al. |
| 2008/0085687 A1* | 4/2008 | Brekke ............ H04M 1/663 455/187.1 |
| 2008/0146200 A1 | 6/2008 | Martin et al. |
| 2009/0103696 A1 | 4/2009 | Davison |
| 2009/0190734 A1 | 7/2009 | White et al. |
| 2009/0232294 A1 | 9/2009 | Xie et al. |
| 2010/0297989 A1 | 11/2010 | Noldus |
| 2011/0069824 A1 | 3/2011 | Martin |

* cited by examiner

METHOD AND APPARATUS FOR SELECTIVE SILENCING OF TELEPHONE RINGING

CROSS REFERENCE TO RELATED APPLICATION

This application a continuation of U.S. patent application Ser. No. 14/843,242 filed on Sep. 2, 2015 which is a continuation of U.S. patent application Ser. No. 13/740,555 filed on Jan. 14, 2013 and assigned U.S. Pat. No. 9,167,088 issued on Oct. 20, 2015 which is a continuation of U.S. patent application Ser. No. 13/299,811 filed on Nov. 18, 2011 and assigned U.S. Pat. No. 8,369,494 issued on Feb. 5, 2013 which is a continuation of U.S. patent application Ser. No. 12/407,074 filed on Mar. 19, 2009 and assigned U.S. Pat. No. 8,139,747 issued on Mar. 20, 2012 which claims a priority to a U.S. Provisional Application Ser. No. 61/070,077 filed Mar. 20, 2008, the teachings of which are incorporated herein by reference.

BACKGROUND

Field of the Invention

The present invention relates to devices that prevent interruptions from telemarketers and other unwanted telephone calls. More particularly, the present invention relates to the devices used for call screening and processing of unwanted calls from interfering with a recipient's daily routine.

Description of the Related Art

As daily life becomes ever-more hectic, the opportunity to spend some period of time without being interrupted/disturbed by telemarketers, charity solicitors, and telephone surveys becomes increasingly valuable.

In response to the public uproar over the intrusions of telemarketers calling to offer unneeded and unwanted products, a "DO NOT CALL LIST" was created by the government to prevent unwanted intrusions by telemarketers. However, the "DO NOT CALL LIST" is not a complete solution as there are exemptions for entities, such as not-for-profit agencies, political pollsters, etc.

In addition, many people are unaware that every time they register with a website, use a credit card, or sign up to make a purchase, there is a potential that the fine print of the agreement includes an agreement to receive calls regarding products and services relating to the website, use of the credit card, etc.

In further annoyance of the public, due to the fact that people rarely if ever return a sales call left on an answering machine or voice mail, telemarketers use automated calling equipment that dials a telephone number but does not route the call to an available telemarketer unless someone speaks (voice activation) at the receiving end. Thus, the unwanted telephone will ring and if the recipient merely picks up the telephone and does not speak, there is dead silence at the other end. Sometimes after responding to the unwanted calls, one will hear "Please wait for an important message" because all of the telemarketers are busy on other calls.

Moreover, to exacerbate the problem even further, many types of telemarketing telephone dialing equipment disconnects the call as soon as the answering machine or voice-mail answers the incoming call. This disconnection often results in one hearing 30 seconds or more of a dial tone recorded on their answering machine because the telemarketing system hung up just before the answering machine answered, and thus the dial tone comes on as though an outgoing call is being made.

Sometimes not only is the dial-tone recorded, but after a certain amount of time the local telephone company plays the message "If you like to make a call, please hang up" followed by a totally obnoxious noise intended to let you know that the phone is not ready to receive calls. These noises are often recorded on the answering machine, and unless the sound is turned off, subjects anyone in the house (people as well as pets) to this barrage of noise.

Accordingly, the ringing of the telephone is an endless interruption despite having screening services and/or devices. Even if the telemarketing machine hangs up, there will be a number of re-tries over a period of time. Hence, if one is involved in an activity and not desiring to answer the telephone, such a person will be subjected to hearing the phone ring again and again, followed by a disconnect just as the answering machine activates. The inventor of the present application is experiencing on more than one occasion the telephone ringing to wake his child after rocking the baby to sleep, with the bulk of the calls being from a telemarketer as late as 8 pm. The result is that the infant child wakes it is much more difficult to get the child to go off to sleep. Thus, the intrusions of unwanted calls are a heavy burden on the general public.

On the other hand, many people have family, friends and job responsibilities that are such that they do not want to simply shut off the ringer on the telephone. They still want to be able to receive important calls, sometimes emergency calls, without being bothered by the nonsense of sales calls, "not-for profit" survey calls and other unwanted calls from some entities which are exempt from the "DO NOT CALL" regulations.

In an attempt to solve the aforementioned problem, there have been systems designed, such as U.S. Pat. No. 7,295,660 to Higginbotham et al., which provides for telemarketing screening operation by compiling a telemarketer blacklist and an associated whitelist. When a caller's telephone number is not on one of the blacklist or whitelist, the caller can be challenged to identify themselves, and the recipient of the call can press a button on the telephone that indicates whether call is to be maintained or handled as a telemarketing call, in which an outgoing message may be played requesting that such calls cease.

Another invention disclosed by U.S. Pat. No. 7,333,599 to Moss, et al., provides a system and method in which all call to a customer's directory number are intercepted by a service node for disposition. The call is then forwarded to the subscriber's home, and when the call is answered, the service node states the name or telephone number of the calling partner retrieved from signaling information. The caller can then decide whether to take the call, deny the call, or send the call to voice mail and/or send a sales refusal message or other disposition.

Still another invention disclosed by U.S. Pat. No. 7,231,029 provides an on-demand call blocking service. This type of service is an improvement over an anonymous call blocking service, which would merely block all anonymous calls regardless of the identity of the caller. The subscriber can first receive the incoming call, and then decide to block the calls in the future.

In most of the systems described herein above, the result is that the recipient still has the problem of listening to the unwanted telephone ring a number of times causing it to interrupt one's daily activity, followed by retries at certain time intervals as set by the caller, or needs to compile a cumbersome list, such as a blacklist, and/or an allowed group of numbers arranged in a whitelist.

In such cases, the telephone numbers must be entered and the telephone number compared with one or more lists, or the caller has to listen to the beginning of a sales call and then identify the number to be listed on a blocked list to prevent future calls.

Thus, there is a need in the art for a less cumbersome way of reducing the number of times that a consumer's telephone rings with intrusive and nuisance calls.

SUMMARY

The present invention provides a system and method for a selective ring silencer that prevents people from having to listen to the telephone ring on and on with undesired calls. The present invention frees the user from having the interruption of hearing the telephone ring due to telemarketing and other types of nuisance calls. Unlike other attempts at shielding a recipient from nuisance calls, the present invention advantageously does not require to receive a nuisance call at least once and then flag the number for subsequent calls. This is a particular problem solved by the present invention, as telemarketers will call from a plurality of different numbers and the recipient might have to enter dozens of numbers just to block one particular vendor.

The present invention may be embodied as a stand alone apparatus and/or could be provided as a service by the telephone company, or can be part of a telephone system. An exemplary aspect of the invention is to prevent the ringing of the telephone of all calls that have been originated from a toll-free number, such as 800 or 866, and calls identified as unknown calls as the inventor has determined that a large number of telemarketing and nuisance calls originate from toll-free area codes. As an option, such calls may be routed to a user's voicemail, but in any event the invention intercepts or forwards the call to a voicemail so that user's telephone does not ring.

BRIEF DESCRIPTION OF THE DRAWINGS

The above-mentioned and other features, and advantages of the present invention will become more apparent from the following detailed description when taken in conjunction with the accompanying drawings, in which.

DETAILED DESCRIPTION

In the following description, for purposes of explanation rather than limitation, specific details are set forth such as the particular architecture, interfaces, techniques, etc., in order to provide a thorough understanding of the present invention by a person of ordinary skill in the art. However, it will be apparent to those skilled in the art that the ring silencer according to the present invention may be practiced in other embodiments which depart from these exemplary embodiments, but are still within the spirit of the invention and the scope of the appended claims. Moreover, for the purpose of clarity, detailed descriptions of well-known devices, circuits, and methods may be omitted so as not to obscure the description of the present invention with unnecessary detail of such well-known devices, circuits and methods.

Figure 1A:
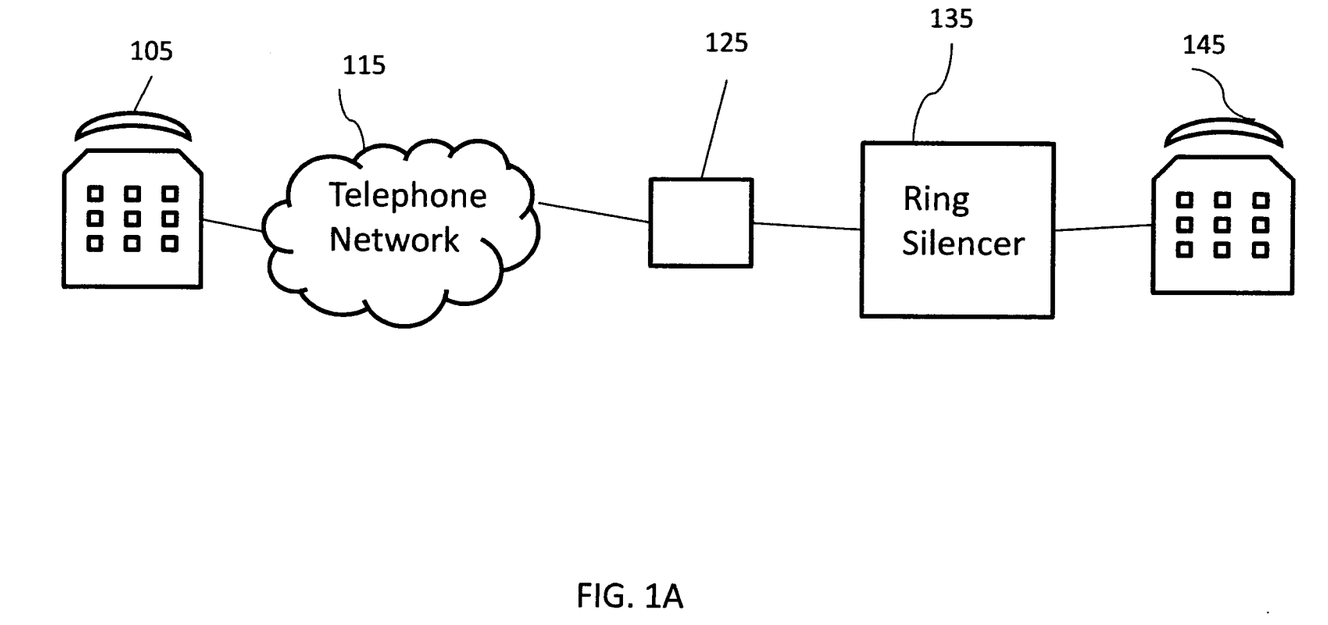
FIG. 1A illustrates a simplified block diagram of a ring-silencing system according to the present invention.

Referring to FIG. 1A, a first exemplary embodiment of a system in which the present invention operates may include a telephone network 115, a telephone jack 125, a ring silencer 135 according to the present invention, and a receiving telephone 145. In this particular exemplary embodiment, the telephone 145 is connected in series with the ring silencer 135.

Still referring to FIG. 1A, upon receiving a call from a telemarketer 105 or unwanted calls, the ring silencer 135 first receives the call. In a ready state, the ring silencer 135 would preferably have the connection to telephone 145 disconnected. According to this exemplary embodiment, the ring silencer 135 reads the Caller Identification Data (CID) signal and blocks or silences the telephone ring in response to all incoming numbers having a toll-free area code, such as 800 and 866, 877, 888, and planned editions of 855, 844, 833 and 822 just to name a few. Alternatively, the unwanted incoming calls can be forwarded to a voice mail without having the telephone ring. Note that the teachings of the present invention are applicable to mobile or cell phone systems where vibration or indication of light on the device is implemented in lieu of telephone ring. In these systems, vibration, light indicator, or other form of notification of incoming calls will be silenced if it is determined to be undesired calls.

Optionally, "out of area" area codes could be blocked without having the telephone ring as well. For example, a user may be divorced and have an ex-spouse living in the 312 area (Chicago). Thus, the user can block all incoming calls with that area code by silencing the telephone ring, or selectively forward such calls to a voice mail module 142 without having the telephone ring. A person of ordinary skill in the art understands and appreciates that the voice mail identified by module 142 could be a separate standalone module or a voice mail system provided by the telephone carrier.

With regard to selective forwarding, the present invention advantageously permits the user to block, silence the ring, or forward to voice mail all calls originating from area codes where people live and which the user does not wish to speak to, either at the moment, or in perpetuity, without having the telephone ring.

For example, the present invention can forward to voice mail all calls originating from the area code where one's mother-in-law lives, and not even cause the interruption of hearing the telephone ring. In addition, the front office of a Major League Baseball team located in Boston, Mass. can forward to voicemail all ticket requests made from a New York or New Jersey area code without having the telephone ring and thus provide preferential to service local fans. Also, ticket vending companies can cut down out speculators from out of the area trying to buy tickets for an event merely to resell on an auction site.

If the area code read by the CID is not a toll-free exchange, the area code or a particular number can be programmed to be blocked without having the telephone ring as thought the number is a toll-free area code. CIDs that do not provide an area code. For example, such calls to be blocked may include those that indicate a "private" "blocked" or "out of area" (including international calls) area code. These calls can optionally be blocked from reaching the receiving telephone 145 in addition to the blocked toll-free calls.

The ring silencer can identify incoming toll-free calls in a number of ways that may include hardware, firmware, software, or a combination thereof. For example, U.S. Pat. No. 5,351,289, which is hereby incorporated by reference as background material, discloses an electronic switching means that includes control logic circuitry that determines whether to allow subsequent power ring signals to pass to a telecommunication device based on a comparison of the received CID and a stored reference data input from the user.

However, unlike previous devices, the ring silencer according to the this exemplary embodiment of the present invention would be pre-programmed to block entire area codes identified as being toll-free numbers without having the telephone ring. In addition, if the telephone industry designates additional area codes as being toll-free, such information can be downloaded to the ring silencer. Thus, it is preferable that the ring silencer has an updateable identification of toll-free area codes.

A person of ordinary skill in the art should understand that while the term ringer is used repeatedly throughout, the invention silences any type of indication from a telecommunication device that would serve as in interruption or intrusion, including the notification that may occur on a television or computer of an incoming telephone call, particularly in a voice over IP telephone protocol.

Figure 1B:
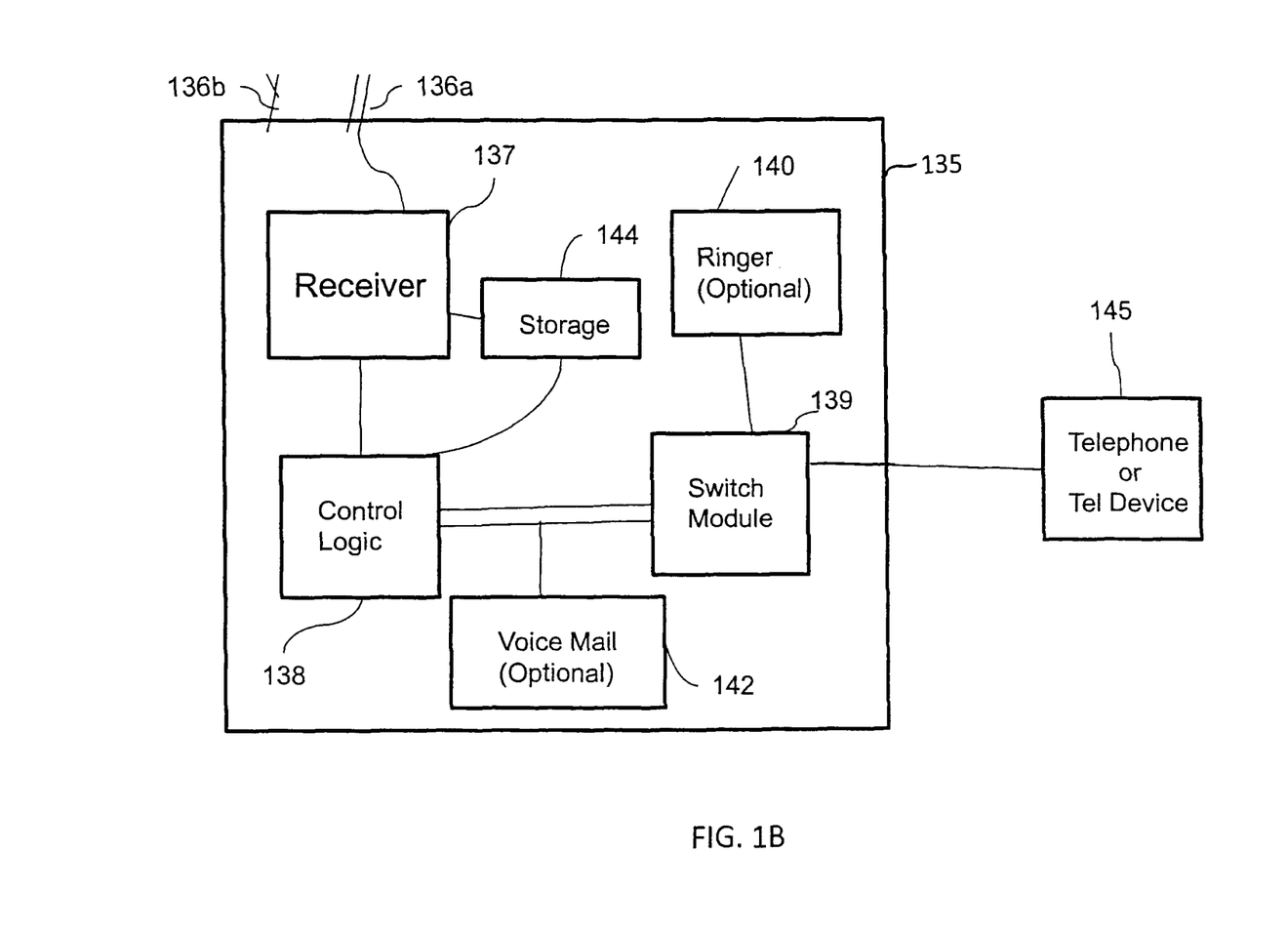
FIG. 1B illustrates an exemplary embodiment of a ring silencer module according to the present invention as shown in FIG. 1A.

FIG. 1B is one exemplary diagram of a ring silencer according to the first exemplary embodiment. A person of ordinary skill in the art will appreciate that while FIG. 1A shows a connection the telephone network, such a connection could be wireless, as evidenced by antenna 136b, conventional copper, fiber optic, or broadband, as sent over line 136a.

The present invention also works via an Internet connection (Voice over IP), and/or any telephone service provided by cable television companies and/or broadband service providers. In such cases, there may be a modem, which might include a router (not shown), typically provided by the communication company that would be output to one's telephone equipment. Some broadband services permit an audio tone to be played on the television set (with the number and or identification information overlaid on the display). In the case of a fiber optic line, there would typically be a wavelength division demultiplexer and an optical to electrical converter to convert the signals into electrical signals that can be used with a communication device, typically a telephone. Other electrical to topical converters may be present as desired.

Still referring to FIG. 1B, the incoming telephone call is received first by a receiver 137, which may demodulate the signal received from either of the antenna 136b, or line 136a. If there is a modem arranged before the signal is input into the ring silencer, the signal would not have to be demodulated by the receiver, but might have to converted (i.e. optical signal/electrical, and/or parallel/serial, etc.) prior to being forwarded to the control logic module 13. Both the receiver module 137 and control logic 138 may communicate with storage 141, which may provide a buffer function. The storage 141 may also additionally store items that enhance the functionality of the ring silencer, which could optionally include storage of discrete numbers or other area codes as being blocked.

The control logic 138 reads the CID, and if the area code is a toll-free area code (typically an 800 or 866), the switch does not forward the call signal to the telephonic equipment 145. However, if the call is from a permissible or non-blocked origination, the switch 139 is activated to provide a path to the telephonic device 145. A person of ordinary skill in the art understands and appreciates that the switching can occur to forward a nuisance call or to pass a wanted call.

In a variation of the present invention, an optional ringer, (which could be any type of volume alert ranging from a piezoelectric or electro-restrictive transducer to a bell, buzzer or optical output device, including but not limited to an LED, light or even heat generating device), could in fact provide the alert in lieu of or in addition to telephone's typical indication to prevent recipients from being interrupted with normal telephone rings. A person of ordinary skill in the art should understand that the ringer 140 comprises an alert means, and any audible means including vibration, and physical changes such as temperature, and visual means, or a combination thereof can be considered a ringer.

By using the optional ringer of the invention, a user could simply shut off the ringer on their telephone and let the ringer 140 provide the only indication of an incoming call in a non-interrupting way. In addition, if there is a plurality of telephones on the line, the ring silencer of the present example would preferably receive the call before the other telephones, or the other telephone(s) on the line would ring. Preferably, the invention may be arranged at the incoming location, such as the subscriber termination box (typically in the basement or a closet).

The switch module 139 may comprise any type of switch using hardware, software, firmware, or any combination thereof. Typically, for the ring silencer to prevent ringing of the telephone, the switch would typically initially not provide a connection of the incoming call to the telephonic device 145 until it was determined from the CID whether the call was from a toll-free area code.

Accordingly, unlike conventional devices in which the subscriber must designate specific telephone numbers that are stored on a list and then compared against prior to permitting a call to reach the recipient 145, in this exemplary embodiment of the present invention, the CID is read on an incoming call for the toll just for the area code and automatically blocked when such a call is from a toll-free line without having the telephone ring. The blocking of toll-free area codes is a default programmed into the apparatus.

Figure 1C:
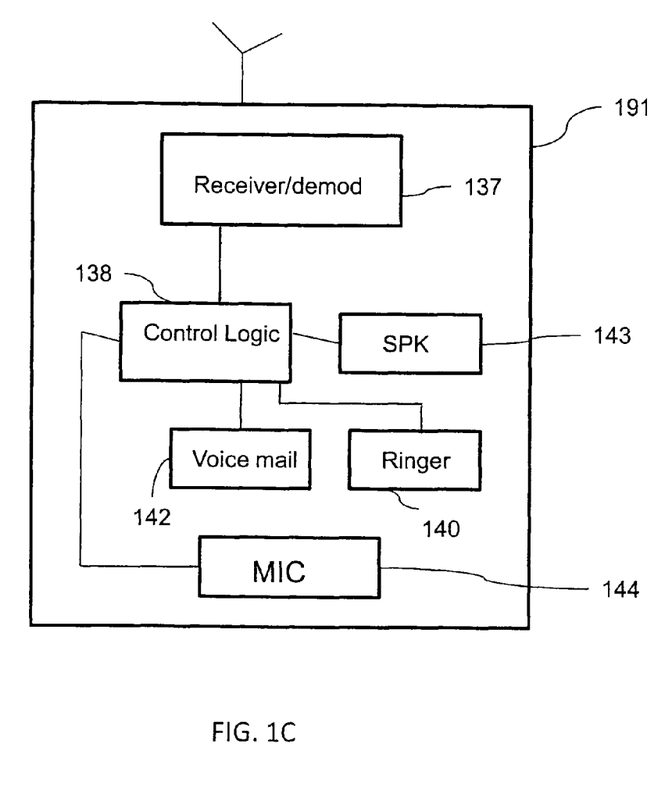
FIG. 1C is an illustration of a telephone including a ring silencer according an exemplary embodiment of to the present invention.

FIG. 1C illustrates an exemplary embodiment in which the ring silencer according to the present invention is embodied within a telephone 199. The telephone may be wired, or wireless. A cordless telephone would typically have these items arranged in the base unit. Along with the receiver/demodulator 137, control logic 138, voice mail 142, and ringer 140, included are a speaker 143 and microphone 144. The telephone may include conventional features such as keypad, touchpad, touchscreen, and even voice activation; and in the case of a wireless telephone, a display and an antenna. The wireless telephone can use any wireless transmission system, including but in no way limited to, for example, coded division multiple access signal (CDMA) format, time division multiple access (TDMA) format, frequency division multiplexing (FDM) format, orthogonal frequency divisional multiplexing (OFDM) format, or a Global System for Mobile communication (GSM) format. In this exemplary embodiment, the telephone has a voicemail module arranged in the telephone that may receive the incoming call without ringing the telephone.

Alternatively, according to the present invention, a central office may scan the caller identification (CID) and forward the toll-free area code originated calls to a voicemail in or connected to the central office without making the telephone ring. The system may optionally flash a light on the telephone or send a message without making the phone vibrate or play any type of tone so as to leave the recipient undisturbed.

Figure 1D:
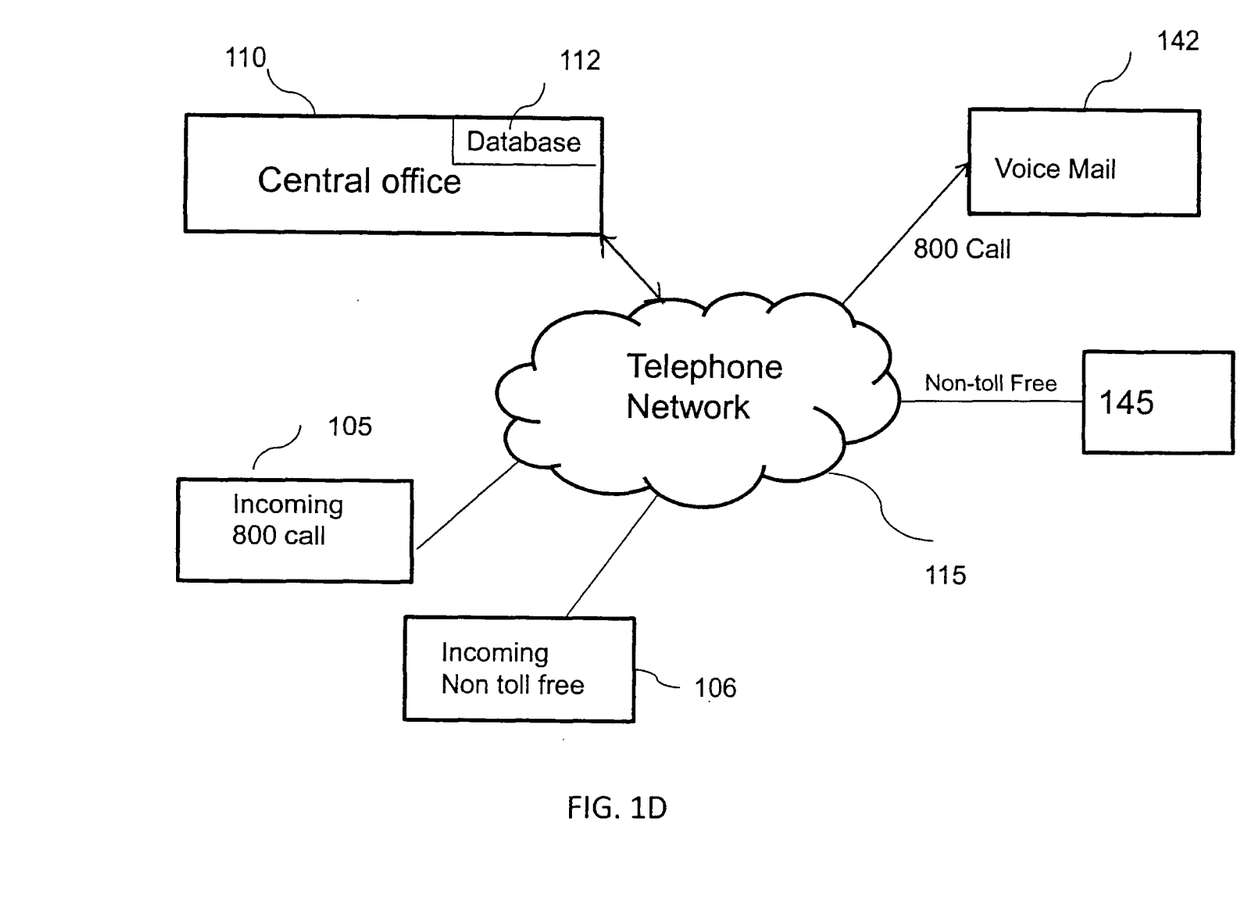
FIG. 1D is an exemplary illustration of a telephone network offering a selective ringer service according to the present invention.

In yet another embodiment shown in FIG. 1D, the selective ringer service is provided by the central office 110 of the telephone company. A subscriber listed of recipient telephone numbers registered for selective ringer service would be stored in a database 112 which may be located in or simply accessible by the central office.

Still referring to FIG. 1D, when an incoming call 105 from an 800 originated (e.g. toll-free) area code is made to recipient 145, the central office, 110, in communication with the network 115 reads the area code of the incoming call and determines whether the recipient is on the selective ring list. As the call 105 is a toll-free originated call, the central office routes (or instructs) that the call be routed to voice mail module 142. At the same time, the telephone 145 never rings to bother the recipient with the toll-free originated call. It is possible that a light on the user phone is activated, and for example, a specific color light, intensity, flashing, etc. may indicate that the voicemail contains a toll-free originated call.

Again referring to FIG. 1D, in contrast to an incoming call made from a toll-free area code, call 106 is made by a non-toll-free area code. This call is routed to the user 145 as it is not a toll-free call, and presumed not be a sales call.

Additionally, the user can add area codes in addition to the toll-free codes, and even discrete telephone numbers, so as to block nuisance or harassment calls from non toll-free originating numbers. The addition can be entered from the telephone keypad, or even flagging certain harassing calls by a typing certain combination of keypad entries.

Moreover, the unidentifiable calls may be added to the toll-free calls to be forwarded without ringing the recipient's telephone.

Figure 2:
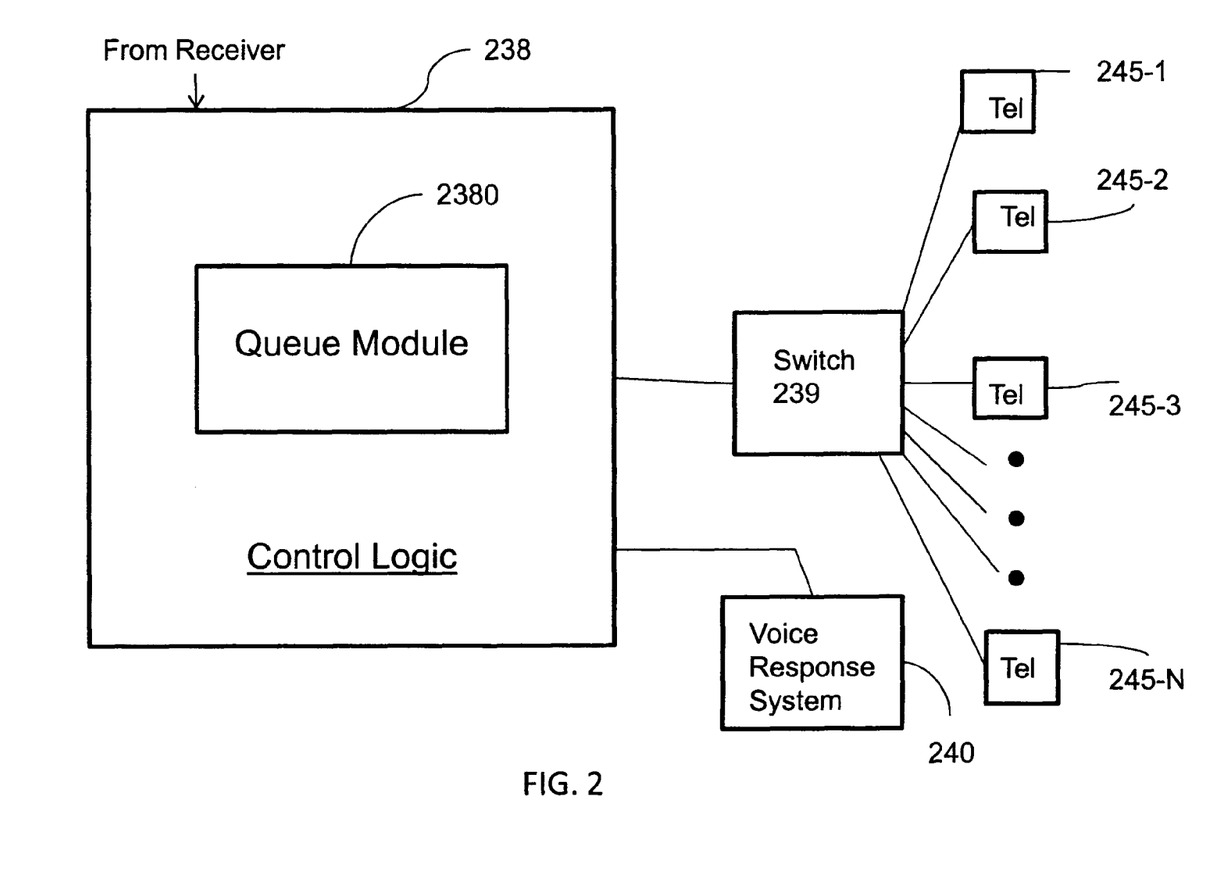
FIG. 2 is an exemplary illustration of a call queuing apparatus according to the present invention.

As shown in FIG. 2, in another exemplary embodiment of the present invention, the selective forwarding can have a commercial purpose that is different from silencing the ring on incoming nuisance calls. In this exemplary embodiment, control logic 238 contains a queue module 2380 that is connected via switch 239 to a plurality of telephones (245-1 to 245-n). In this case, a plurality of incoming calls may come into a call center. The control logic 238 reads at least the area code of the CID information and assigns priority in a queue sub-module 2380 based on a preprogrammed priority scheme.

Thus, callers from originating area codes with a greater history of purchases, or from originating area codes deemed to have more disposal income or some other attribute that is more desirable than in other area codes are given prioritized queuing.

Rather, a company with a significant amount of telephone based sales, can utilizing a queuing system based on area code. The correlation may be related to past sales, or demographics.

For example, if there are ten telephone operators on duty, preprogrammed area codes where the annual income is ranked as being the highest can be serviced first, and other areas given a lower priority in the queue or forwarded to a voice response system 240. The queue may be part of the control logic, or a separate module. In any event, the selective forwarding or queuing typically would be area-code based. Also, entities that take calls from all over the country, such a radio station, or an incoming toll-free for real estate, etc., could be selectively answered and forwarded to specialists from certain area codes without having separate call in lines or having to prompt a caller as to where they are calling from.

In the case where incoming calls have a CID that is blocked, or indicated as private, or out of area, etc., the control logic unit can be programmed as a default to give a low priority, or merely forwarded to a voice response system without having the telephone ring.

Additionally, cellular area codes could be classified as either area codes from which nuisance calls originate or deemed passable, depending on preference. For example, 917 area codes were initially offered to users of pagers and cell phones. Whether or not to receive or forward/block such calls would be a user-option.

Figure 3:
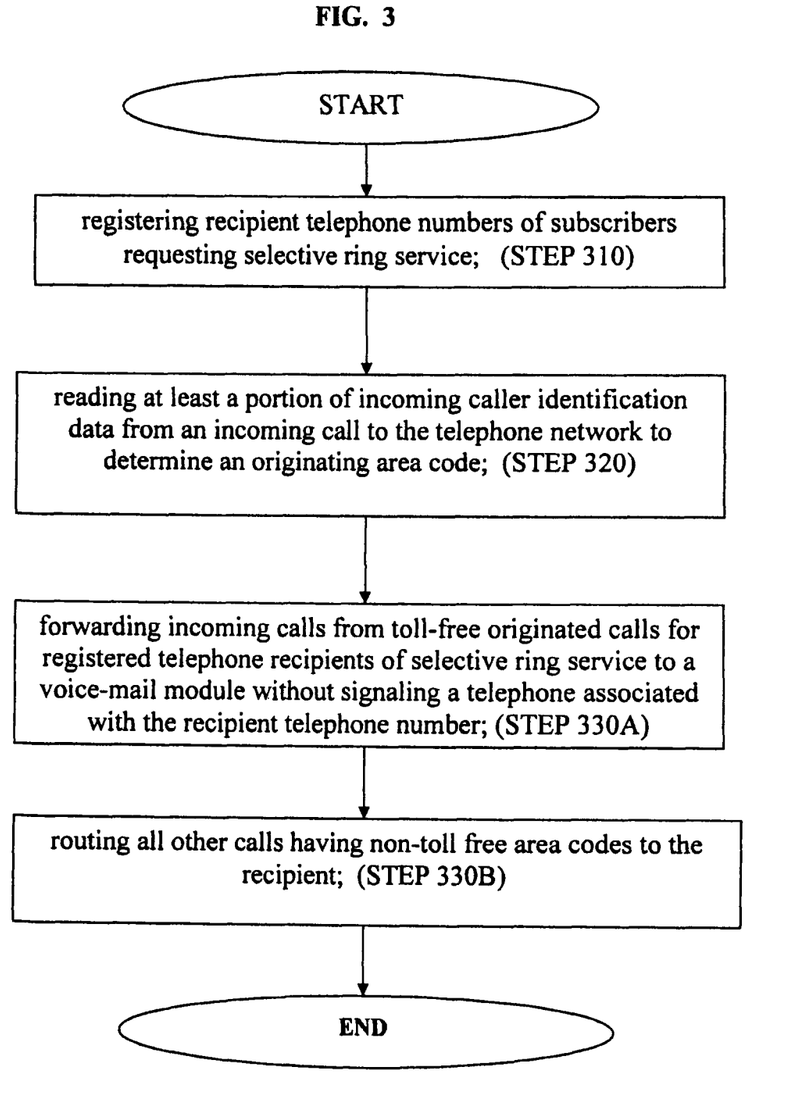
FIG. 3 is a flowchart of an exemplary method for a selective ring service according to the present invention.

FIG. 3 is a flowchart showing an exemplary method according to the present invention. These steps can be preformed, for example, at a central office of a telephone network, or by an apparatus according to the present invention. At step 310, there is a registering of recipient telephone numbers of subscribers requesting selective ring service. At step 320, at least a portion of incoming caller identification from the incoming call is read to determine the originating area code.

If there is a determination that the call has originated from a toll-free area code, then at step 330A there is a forwarding of the call to a voice-mail module without signaling a telephone calls associated with the recipient telephone number; alternatively, at step 330B the remaining calls are routed to the recipient. In addition, if the area code cannot be determined (i.e. blocked, private, "out of area") such area codes can be programmable to be defaulted as being forwarded to voice mail as well, although these calls can be forwarded to the recipient. It is preferred that such calls be forwarded to voicemail without having the telephone ring, as a telemarketer may try to mask their incoming call identity to evade detection or bypass the system.

Although a preferred embodiment of the invention has been illustrated and described, it will be obvious to those having skill in this art that various other forms and embodiments now may be visualized readily without departing significantly from the spirit and scope of the invention disclosed herein and set forth in the accompanying claims. For example, the control logic means and the receiver could be a single unit, or two separate units, and the demodulation may include decoding in addition to or in lieu of demodulation.

In addition, the above-described methods according to the present invention can be realized in hardware or as software or computer code that can be stored in a medium such as a ROM, an RAM, a floppy disk, a hard disk, or a magneto-optical disk or downloaded over a network, so that the methods described herein can be rendered in such software using a general purpose microprocessor, general purpose computer, or a special processor or in programmable or dedicated hardware, such as an ASIC or FPGA.

As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

What is claimed is:

1. An electronic device for providing a selective forwarding of an incoming call, comprising:
   a receiver configured to receive an input communication signal from a calling party;
   a controller, in communication with the receiver, configured to read at least a portion of the data output from the receiver,
   wherein the controller detects an identification of the incoming call from the calling party, and in response to detecting the identification of the incoming call, assigns priority based on a predefined scheme, wherein a higher priority call is notified to a user, and a lower priority call is forwarded to voice mail without notifying the user of a receipt of the incoming call, regardless of a time of receipt of the incoming call during the selective forwarding.

2. The electronic device of claim 1, wherein the controller is further configured to provide a notification for indicating a reception of the voice mail from the calling party.

3. The electronic device of claim 1, wherein, when the identification of the incoming call is one of a toll-free code, an out of area code, a private and a block.

4. The electronic device of claim 1, wherein the electronic device is wired or wireless phone.

5. The electronic device of claim 1, wherein the electronic device is a mobile phone or a cell phone.

6. The electronic device of claim 1, wherein the lower priority call forwarded to the voice mail without having the electronic device ring is stored for future blocking.

7. The electronic device of claim 1, wherein the controller detects at least the area code of the incoming call and assigns the priority based on the predefined scheme.

8. The electronic device of claim 1, wherein discrete telephone numbers corresponding to unwanted incoming numbers is stored via a keypad or by flagging the unwanted incoming numbers, for future blocking.

9. The electronic device of claim 1, wherein a notification of the incoming call occurs on a television or a computer in a voice over IP protocol.

10. The electronic device of claim 9, wherein the notification includes an audible means including vibration, a light indicator or any combination thereof.

11. The electronic device of claim 1, wherein the voice mail is provided in the electronic device or by a telephone carrier.

12. The electronic device of claim 1, wherein the electronic device is a television or a computer.

13. A mobile terminal having a touch screen for providing a selective forwarding of an incoming call, comprising:
   one or more processors; and
   a non-transitory computer-readable medium storing a plurality of instructions that when executed by the processor cause a plurality of operations, wherein the plurality of operations comprise:
   in response to the incoming call, detecting an identification of the incoming call from a calling party;
   assigning priority on the incoming call based on a predefined scheme, wherein a higher priority call is notified to a user and a lower priority call is forwarded to voice mail without notifying a receipt of the incoming call to the user, regardless of a time of receipt of the incoming call during the selective forwarding; and
   providing a notification for indicating a reception of the voice mail.

14. The mobile terminal of claim 13, wherein the identification of the incoming call is one of a toll-free code, an out of area code, a private and a block.

15. The mobile terminal of claim 13, wherein the mobile terminal is wired or wireless phone.

16. The mobile terminal of claim 13, wherein the mobile terminal is a mobile phone, a cell phone, a television or a computer.

17. The mobile terminal of claim 13, wherein the lower priority call forwarded to the voice mail is stored for future blocking.

18. The mobile terminal of claim 13, wherein the one or more processor detects at least the area code of the incoming call and assigns the priority based on the predefined scheme.

19. The mobile terminal of claim 13, wherein a notification of the incoming call occurs on a television or a computer in a voice over IP protocol.

20. A non-transitory computer-readable medium comprising executable data capable of causing a programmable device to perform the steps of:
   in response to an incoming call, detecting an identification of the incoming call from a calling party;
   assigning priority on the incoming call based on a predefined scheme, wherein a higher priority call is forwarded to a user and a lower priority call is forwarded to voice mail without notifying a receipt of the incoming call to the user, regardless of a time of receipt of the incoming call during a selective forwarding mode; and
   providing a notification for indicating a reception of the voice mail.

* * * * *